United States Patent
Furuya

(10) Patent No.: US 9,152,733 B2
(45) Date of Patent: Oct. 6, 2015

(54) INFORMATION PROCESSOR

(75) Inventor: Tomoki Furuya, Tokyo (JP)

(73) Assignee: LENOVO INNOVATIONS LIMITED (HONG KONG), Quarry Bay (HK)

( * ) Notice: Subject to any disclaimer, the term of this patent is extended or adjusted under 35 U.S.C. 154(b) by 412 days.

(21) Appl. No.: 13/388,441

(22) PCT Filed: May 20, 2010

(86) PCT No.: PCT/JP2010/003382
§ 371 (c)(1),
(2), (4) Date: Feb. 1, 2012

(87) PCT Pub. No.: WO2011/021326
PCT Pub. Date: Feb. 24, 2011

(65) Prior Publication Data
US 2012/0130708 A1  May 24, 2012

(30) Foreign Application Priority Data

Aug. 19, 2009  (JP) ................. 2009-189942

(51) Int. Cl.
*G10L 15/04* (2013.01)
*G06F 17/30* (2006.01)
*G06F 21/31* (2013.01)
(52) U.S. Cl.
CPC .......... *G06F 17/30905* (2013.01); *G06F 21/31* (2013.01); *G06F 2221/2115* (2013.01); *G06F 2221/2117* (2013.01); *G06F 2221/2119* (2013.01)
(58) Field of Classification Search
CPC ................................. G10F 21/6254
USPC ...................................... 704/251, 9
See application file for complete search history.

(56) References Cited

U.S. PATENT DOCUMENTS

| 6,799,300 | B1  | 9/2004  | Hishida et al. |
| 7,383,299 | B1* | 6/2008  | Hailpern et al. ............. 709/203 |
| 7,437,296 | B2* | 10/2008 | Inoue et al. .................... 704/275 |
| 7,620,651 | B2* | 11/2009 | Chea et al. ..................... 707/750 |
| 8,219,071 | B2* | 7/2012  | Kokubo et al. ............ 455/414.4 |
| 2003/0101231 | A1* | 5/2003 | Kausik et al. ................. 709/217 |
| 2004/0193897 | A1* | 9/2004 | Van Volkenburgh .......... 713/189 |

(Continued)

FOREIGN PATENT DOCUMENTS

| CN | 1293779 A     | 5/2001 |
| JP | 2002-149638 A | 5/2002 |

(Continued)

OTHER PUBLICATIONS

Japanese Office Action dated Apr. 15, 2014, with English translation.

(Continued)

*Primary Examiner* — Jakieda Jackson

(57) ABSTRACT

An information processor includes a keyword registration means for accepting an input of a keyword composed of a predetermined character string and storing the accepted keyword in a storage device; and a content display means for displaying externally acquired content on a display device. The content display means is configured to display the content on the display device by replacing a character string in a preset range containing the keyword with other display data if the keyword stored in the storage device exists in character information contained in the content.

1 Claim, 6 Drawing Sheets

(56) References Cited

U.S. PATENT DOCUMENTS

| | | | |
|---|---|---|---|
| 2004/0216037 A1 | 10/2004 | Hishida et al. | |
| 2006/0059519 A1 | 3/2006 | Wada et al. | |
| 2006/0075260 A1* | 4/2006 | Tucker et al. | 713/190 |
| 2006/0085761 A1* | 4/2006 | Allen et al. | 715/780 |
| 2006/0200339 A1* | 9/2006 | Satake et al. | 704/4 |
| 2007/0088852 A1* | 4/2007 | Levkovitz | 709/246 |
| 2007/0124601 A1* | 5/2007 | Singh et al. | 713/189 |
| 2007/0157123 A1* | 7/2007 | Ikawa et al. | 715/816 |
| 2007/0260492 A1* | 11/2007 | Feied et al. | 705/3 |
| 2009/0018832 A1* | 1/2009 | Mukaigaito et al. | 704/251 |
| 2009/0106558 A1* | 4/2009 | Delgrosso et al. | 713/184 |
| 2009/0132419 A1* | 5/2009 | Grammer et al. | 705/50 |
| 2009/0132424 A1* | 5/2009 | Kendrick et al. | 705/75 |
| 2009/0138402 A1* | 5/2009 | Chan et al. | 705/51 |
| 2009/0235199 A1* | 9/2009 | Mastie | 715/781 |
| 2014/0123302 A1* | 5/2014 | Van Volkenburgh | 726/26 |

FOREIGN PATENT DOCUMENTS

| | | |
|---|---|---|
| JP | 2004-213376 A | 7/2004 |
| JP | 2005-222124 A | 8/2005 |
| JP | 2008-27424 A | 2/2008 |
| JP | 2009-93325 A | 4/2009 |

OTHER PUBLICATIONS

Japanese Office action dated Aug. 26, 2014 and a Partial English Translation thereof.

Genba Ito, "Latest SOHO network construction, Establishing useful and secure LAN utilizing the latest technology, No. 4, Web Application, Various on-demand services", Network Magazine, vol. 12, No. 9, Japan, ASII Corporation, Sep. 1, 2007, p. 130-p. 133.

International Search Report (ISR) (PCT Form PCT/ISA/210) dated Aug. 17, 2010, in PCT/JP2010/003382.

* cited by examiner

INFORMATION PROCESSOR

TECHNICAL FIELD

The present invention relates to an information processor and, in particular, to an information processor having a function that allows a user to inspect content delivered from a web site.

BACKGROUND ART

Along with the advancement of internet, various informations are delivered from a web site on the internet. A user can inspect these informations by using an information processing terminal, such as a personal computer or mobile phone. To be specific, an application called browser is incorporated into the information processing terminal, thereby allowing images, characters, and the like delivered from the web site to be inspected on the browser.

On the other hand, huge amount of informations are recently delivered from the web site, whereas even information that the user will not want to inspect and even information that may cause copyright and privacy problems are also delivered in some cases. Under these circumstances, patent document 1 discloses a technique with which the information causing the copyright and privacy problems are not displayed to the user. Specifically, a word dictionary is registered in an electronic news analyzer for relaying delivery of electronic news that are contents. Based on this, it is analyzed whether each portion of the electronic news is unusable limited portion or unlimited portion. Tag information indicating the analysis result is appended to each portion of the electronic news, and this is sent to a user terminal. On the browser of the user terminal, a preset processing is performed by referring to the sent tag information of the electronic news. For example, if a predetermined portion of the electronic news is the unusable limited portion, an obscure processing is performed by overwriting the predetermined portion with other portion, or by deleting it.

Patent document 1: Japanese Unexamined Patent Application Publication No. 2005-222124

SUMMARY OF THE INVENTION

However, with the technique disclosed in the patent document 1, a determination as to whether each portion of the electronic news is the limited portion or unlimited portion is made based on words registered in the electronic news analyzer, and the obscure processing is performed according to the determination result by the user terminal. Therefore, the user cannot recognize what type of information is obscured. Although the processing such as overwriting information of other portion or deleting is performed as example of the obscure processing, the user may be unaware of even the presence of the information of the portion subjected to this processing, and hence it is inconvenient to the user. Further, because the determination as to whether the information is obscured or not is made by the electronic news analyzer, information that the user itself does not want to inspect may not be obscured, and there is a risk that the user becomes uncomfortable.

Therefore, an object of the present invention is to provide an information processor capable of solving the foregoing problem, namely, the inconvenience occurred when the user obtains the content.

For achieving the above object, an information processor, which is an exemplary embodiment of the present invention, includes a keyword registration means for accepting an input of a keyword composed of a predetermined character string and storing the accepted keyword in a storage device; and a content display means for displaying externally acquired content on a display device. The content display means is configured to display the content on the display device by replacing a character string in a preset range containing the keyword with other display data if the keyword stored in the storage device exists in character information contained in the content.

A computer program, which is other exemplary embodiment of the present invention, includes instructions for causing an information processor to implement a keyword registration means for accepting an input of a keyword composed of a predetermined character string and storing the accepted keyword in a storage device; and a content display means for displaying externally acquired content on a display device. The content display means is configured to display the content on the display device by replacing a character string in a preset range containing the keyword with other display data if the keyword stored in the storage device exists in character information contained in the content.

A method of processing information, which is other exemplary embodiment of the present invention, includes accepting an input of a keyword composed of a predetermined character string and storing the accepted keyword in a storage device; and displaying externally acquired content on a display device. When displaying the content, the method is configured to include displaying the content on the display device by replacing a character string in a preset range containing the keyword with other display data if the keyword stored in the storage device exists in character information contained in the content.

The present invention is thus configured to improve user convenience during content inspection.

EXEMPLARY EMBODIMENTS

First Exemplary Embodiment

Figure 1:
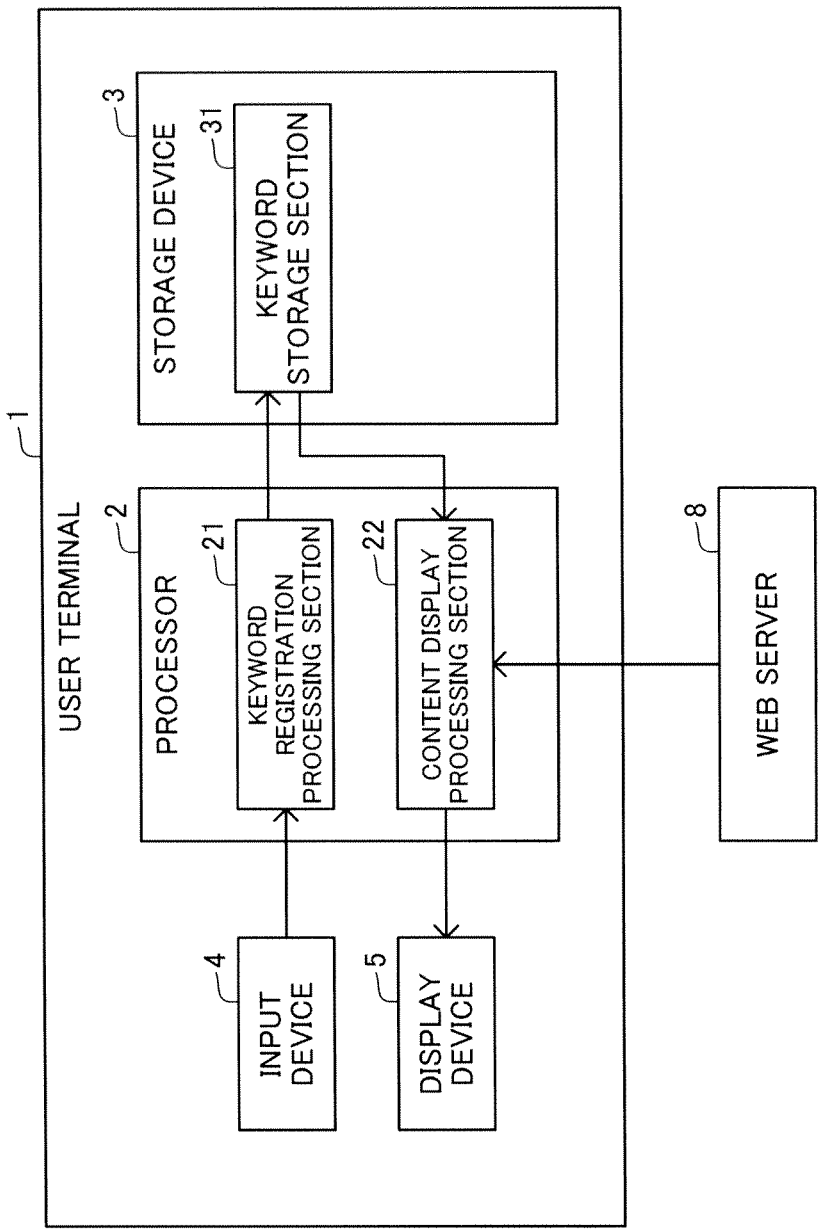
FIG. 1 is a function block diagram showing the configuration of a user terminal in a first exemplary embodiment.
Figure 2:
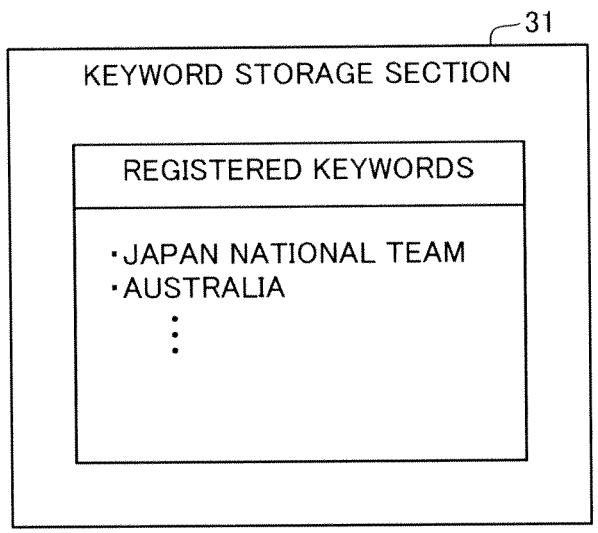
FIG. 2 is a diagram showing an example of data stored in a keyword storage section of the user terminal disclosed in FIG. 1.
Figure 3A:
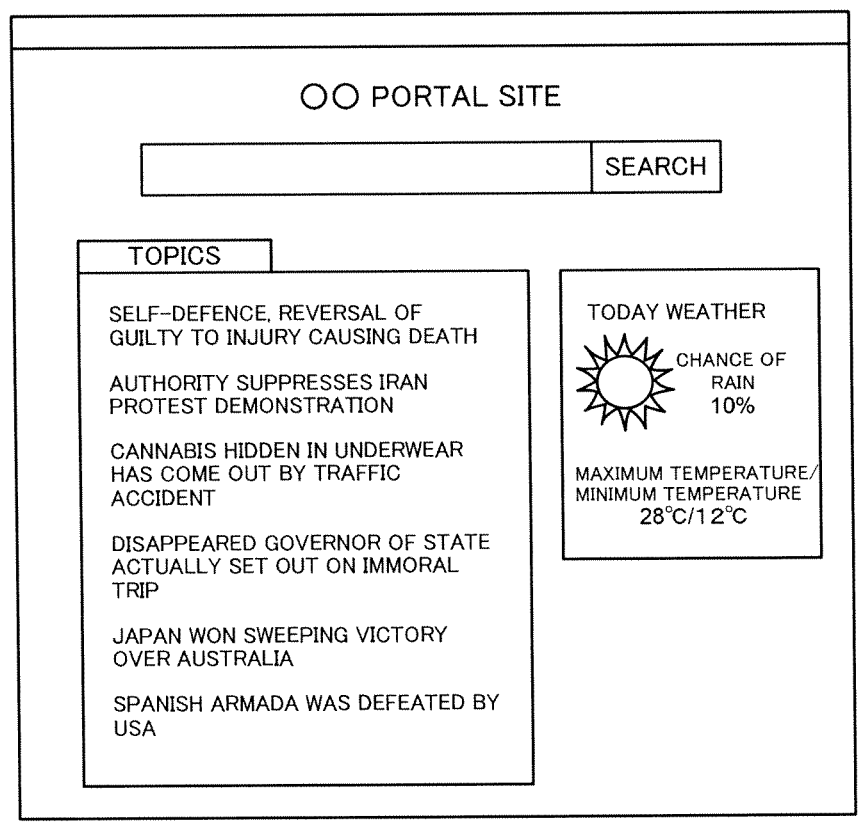
FIG. 3A is a diagram showing a display example in a display device of the user terminal disclosed in FIG. 1.
Figure 3B:
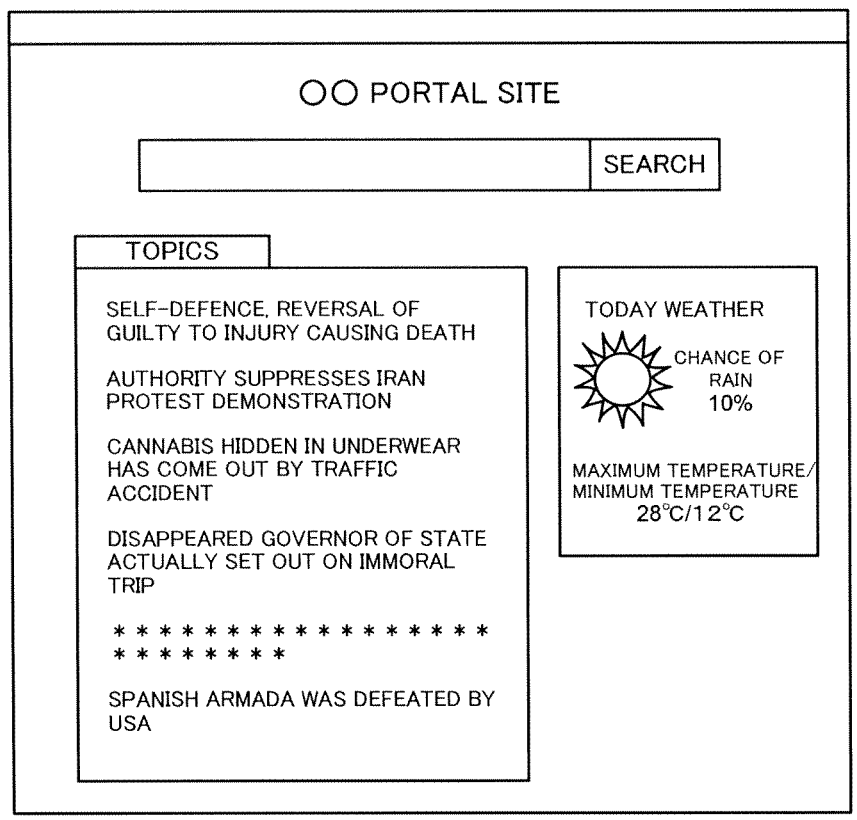
FIG. 3B is a diagram showing other display example in the display device of the user terminal disclosed in FIG. 1.
Figure 4:
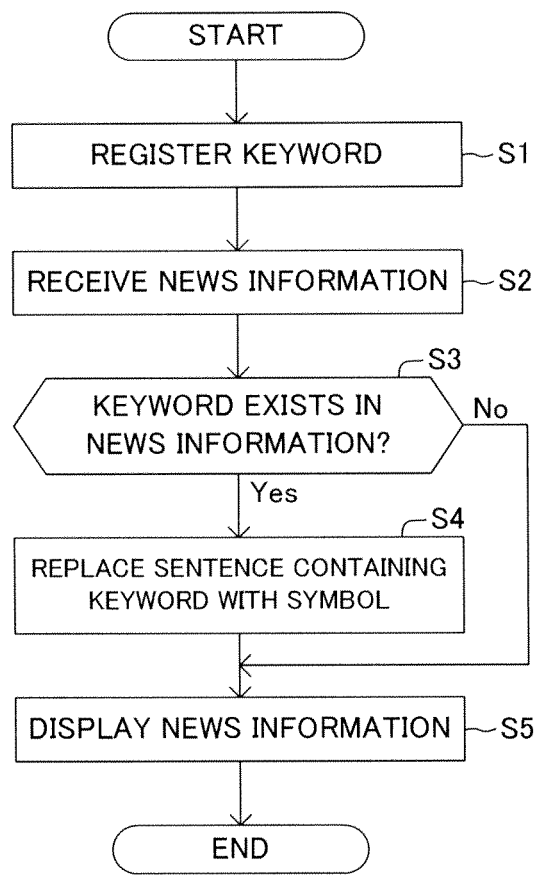
FIG. 4 is a flow chart showing the operations of the user terminal disclosed in FIG. 1.

A first exemplary embodiment of the present invention is described by referring to FIGS. 1 to 4. FIG. 1 is a function block diagram showing the configuration of a user terminal. FIG. 2 is a diagram showing an example of data stored in a keyword storage section of the user terminal. FIGS. 3A and 3B are diagrams showing display examples on a display device of the user terminal. FIG. 4 is a flow chart showing the operations of the user terminal.

<Configuration>

The user terminal 1 shown in FIG. 1 is a general information processor operated by a user, such as a personal computer or mobile phone, and includes a processor 2 such as a CPU (central processing unit), and a storage device 3 such as a hard disk and a flash memory. The user terminal 1 also includes an input device 4 such as a keyboard and a mouse, and a display device 5 such as a display.

The user terminal 1 of the present exemplary embodiment further includes a communication device and permits communication with a web server over the internet. The user terminal 1 includes functions of acquiring content such as news information from the web server, and displaying the content on the display device 5. The configuration of the user terminal 1 is further described in details.

Referring to FIG. 1, the user terminal 1 includes a keyword registration processing section 21 (keyword registration means) and a content display processing section 22 (content display means) which are built by allowing a computer program to be incorporated into the processor 2. The storage device 3 includes a keyword storage section 31. The computer program may be supplied in a state of being stored in a storage medium, such as a CD-ROM, to the user terminal 1, or the computer program stored in other server computer on a network may be supplied via the network to the user terminal 1.

The keyword registration processing section 21 accepts a "keyword" that is a character string inputted by the user through the input device 4 and stores the accepted keyword in the keyword storage section 31. The "keyword" is, for example, a character string estimated to be contained in information such as news that the user does not want to know. For example, if a football game is held between Japan national football team and Australia national football team, and the user does not want to know the game result on the web site or the like, "Japan national team" and "Australia" can be thought of as keywords estimated to be contained in the index of the news information thereof. When the user inputs the keywords, such as "Japan national team" and the like, the keyword registration processing section 21 registers each of these keywords as a "registered keyword" in the keyword storage section 31, as shown in FIG. 2.

The content display processing section 22 has, as a basic function, a function of displaying externally acquired content information on the display 5, such as character information and image information acquired from the web server 8 on the Internet. That is, the content display processing section 22 is content inspection software, for example, so-called "browser." FIG. 3A shows an example of screens displayed on the display device 5 upon inspection of "○○ portal site" delivered from the web server 8 on the Internet. News information called "inspection column" and "topics" are displayed on this site.

When displaying the content on the display device 5, the content display processing section 22 has a function of displaying a character string containing the foregoing keywords stored in the keyword storage section 31 by replacing the character string with unreadable symbols. Specifically, the content display processing section 22 firstly examines whether the character string of the keywords stored in the keyword storage section 31 exists or not in character information contained in the acquired content. If the keywords exist in the character information of the content, the keyword display processing section 22 displays on the display device 5 the character string in the range of a sentence described in an identical paragraph containing the keywords by replacing it with other symbols.

An example of display processing by the content display processing section 22 is explained with reference to FIGS. 3A and 3B. Firstly, it is assumed that information as displayed in FIG. 3A is distributed from the web server 8 to the user terminal 1. The keywords stored in the keyword storage section 31 are contained in character information that "Japan won a sweeping victory over Australia" in the "topics." Therefore, the content display processing section 22 replaces individual characters contained in this sentence with the symbol "*". Then, the content display processing section 22 replaces the sentence "Japan won a sweeping victory over Australia" in the content with "**************", and displays this on the display device 5 as shown in FIG. 3B.

Although the case of replacing the range of the character string of the sentence described in the identical paragraph containing the keywords with the symbols is illustrated above, the range of the character string replaced with the symbols is not limited to the above-mentioned range. For example, even for a character string extending over a plurality of paragraphs, a range of the character string determined as the same information on the basis of a preset reference may be replaced with symbols. Specifically, if address information to other web site is set as a keyword, namely, a so-called link is set, a character string in such a range to which identical address information is set may be replaced with symbols.

Although the case of replacing the characters in the range containing the keywords with the symbol "*" is illustrated above, replacement data may be any display data. That is, other symbols or other character data may be used. However, the replacement data are preferably data displayed so that human beings cannot understand the content of the character string before being replaced.

<Operations>

The operations of the user terminal 1 in the present exemplary embodiment are described by referring to the flow chart of FIG. 4. Firstly, if it is estimated that there is information, for example, news that a user does not want to know, the user inputs to the user terminal 1 keywords that are character strings estimated to be contained in the news. Then, the user terminal 1 stores the inputted keywords in the keyword storage section 31, as shown in FIG. 2 (step S1). For example, it is assumed here that the user does not want to know the news of the game result between Japan national football team and Australia national football team. It is therefore assumed that "Japan national team" and "Australia" are registered as keywords of the news.

Thereafter, the user terminal 1 receives the news information from the web server 8 via the network (step S2). At this time, the user terminal 1 examines whether the keywords registered in the keyword storage section 31 as described above are contained in the received news information (step S3).

If the keywords are not contained in the news information ("NO" in step S3), the user terminal 1 displays the received news information in its present form (step S5). On the other hand, if the keywords are contained in the news information ("YES" in step S3), the user terminal 1 replaces a character string in a predetermined range, such as a sentence of a paragraph containing the keywords in the news information, with characters or symbols unreadable by the user (step S4), and then displays this on the display device 5 (step S5). For example, if a sentence that "Japan won a sweeping victory over Australia" is contained in the news information, the keywords "Japan" and "Australia" are contained in the sentence. Therefore, the user terminal 1 displays the sentence by converting it to symbols such as "**************" so that the user cannot understand the content of the sentence.

Thus, according to the present exemplary embodiment, the news information containing the keywords registered by the user is displayed after being converted to the symbols, thereby making it difficult for the user to recognize the content of the information. On the other hand, by viewing the display data after being replaced with the symbols, the user can recognize that the information related to the registered keywords is displayed. Consequently, the user can know the presence of the information containing the keywords, without recognizing the content of the information that the user does not want to know. That is, to the user who does not want to know the content of specific information but desires notification of the occurrence of the information, the content of the specific information can be obscured while properly notifying the occurrence of the specific information. This improves user convenience.

Second Exemplary Embodiment

Figure 5:
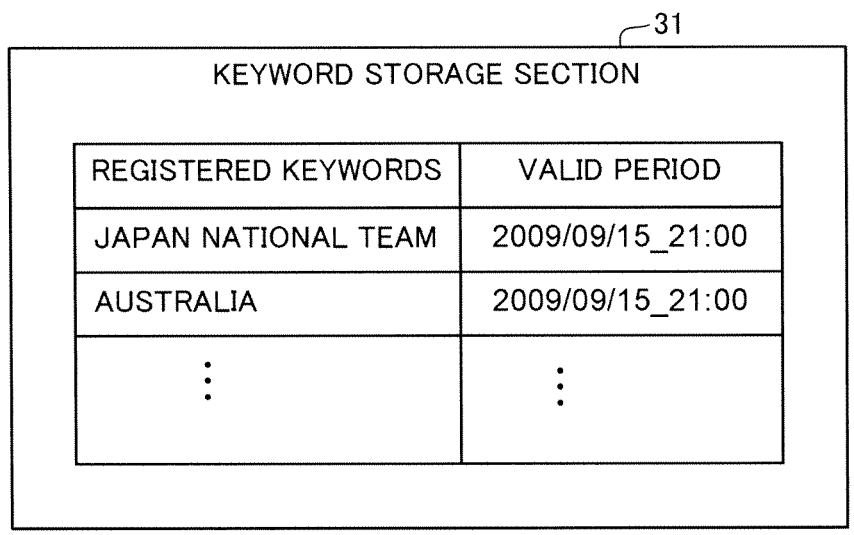
FIG. 5 is a diagram showing an example of data stored in a keyword storage section of a user terminal in a second exemplary embodiment.
Figure 6:
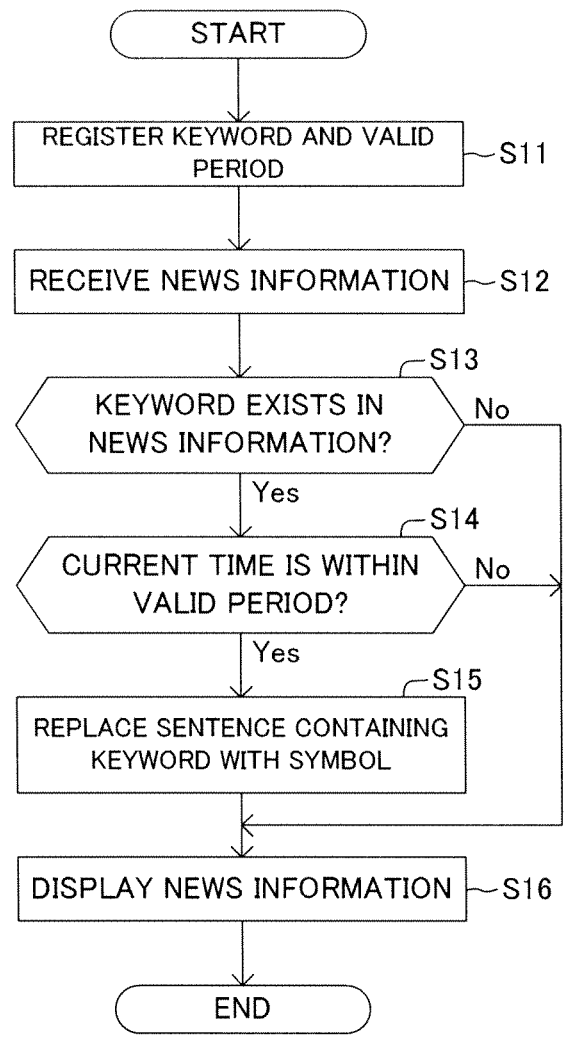
FIG. 6 is a flow chart showing the operations of the user terminal disclosed in FIG. 5.

A second exemplary embodiment of the present invention is described below by referring to FIGS. 5 and 6. FIG. 5 is a diagram showing an example of data stored in a keyword storage section of a user terminal in the present exemplary embodiment. FIG. 6 is a flow chart showing the operations of the user terminal.
<Configuration>

The user terminal 1 of the present exemplary embodiment employs a substantially similar configuration to that of the user terminal in the foregoing first exemplary embodiment, but differs therefrom in theta valid period is set to a keyword. The point that differs from the foregoing exemplary embodiment is described in detail.

A keyword registration processing section 21 (keyword registration means) of the user terminal 1 in the present exemplary embodiment accepts valid period information (period information) together with the above-mentioned keywords from the user via an input device 4. The keyword registration processing section 21 associatedly stores the keywords and the valid period information in the keyword storage section 31, as shown in FIG. 5. The valid period information does not need to be inputted concurrently with the keywords, and it may be inputted before or after the keywords are inputted. That is, the keywords may be firstly registered. Thereafter, a specific keyword may be designated, and a valid period of the keyword may be inputted and then additionally registered in the keyword storage section 31.

Hereat, the valid period information is information indicating a period during which the keywords are valid, namely, a period during which the processing of replacing a character string containing the keywords with symbols is carried out as described later. Specifically, the valid period information in the present exemplary embodiment is, for example, information containing "year, month, date, and time" as shown in FIG. 5.

Similarly to the foregoing first exemplary embodiment, the example in FIG. 5 is the case where the user does not want to know the game result between the Japan national football team and Australia national football team on the web site or the like. In this case, "Japan national team" and "Australia" are registered as keywords, and the time when the football game will be over is further registered as valid period information.

Similarly to the above, a content display processing section 22 (content display means) in the present exemplary embodiment performs processing for replacing information containing keywords registered in the keyword storage section 31 with symbols or the like unreadable by the user. However, the content display processing section 22 determines whether to execute the replacement processing according to the valid period information associated with the keywords contained in content.

To be specific, similarly to the above, the content display processing section 22 firstly acquires content from the web server 8, and examines whether a character string of the keywords stored in the keyword storage section 31 exists in character information contained in the acquired content. If the keywords exist in the character information of the content, the content display processing section 22 compares the valid period information stored associatedly with the keywords, and current time. That is, the content display processing section 22 acquires the current time (current time information) from a clock device for counting time which is installed in the user terminal 1, and examines whether the current time is within the valid period.

Then, if the current time is within the valid period, similarly to the foregoing exemplary embodiment, the content display processing section 22 replaces the character string in a preset range containing the keywords in the content with other display data, and displays the content on the display device 5. On the other hand, if the current time is beyond the valid period, the content display processing section displays the character string of the content in its present form on the display device 5. The current time and the valid period may be compared by time (by minute or second), or by day.
<Operations>

The operations of the user terminal 1 in the present exemplary embodiment are described below by referring to the flow chart of FIG. 6. Firstly, if there is information, for example, news that a user does not want to know, the user inputs to the user terminal 1 keywords which are character strings that can be contained in the news. If there is also a period of time during which the user does not want to know the news, the user inputs a valid period thereof. Then, the user terminal 1 associates the inputted keywords with the inputted valid period, and stores them in the keyword storage section 31 (step S11), as shown in FIG. 5.

Thereafter, the user terminal 1 receives news information from the web server 8 via the network (step S12). At this time, the user terminal 1 examines whether a character string of the keywords registered in the keyword storage section 31 exists in the received news information, as described above (step S13).

If the keywords are contained in the news information ("YES" in step S13), the user terminal 1 reads the valid period information associated with the keywords from the keyword storage section 31, and examines whether current time is within the valid period (step S14). At this time, if the current time is within the valid period ("YES" in step S14), as shown in the foregoing FIG. 3B, the user terminal replaces a character string in a predetermined range, such as a sentence of a paragraph containing the keywords in the news information, with characters or symbols unreadable by the user (step S15), and then displays this on the display device 5 (step S16).

On the other hand, if in the comparison between the current time and the valid period in step S14, the current time is beyond the valid period ("NO" in step S14), even though the keywords are contained in the news information, the user terminal displays the news information retaining its original characters on the display device 5 (step S16). If the keywords are not contained in the news information ("NO" in step S13), similarly to the above, the user terminal displays the news information in its original characters on the display device 5 (step S16).

Thus, according to the present exemplary embodiment, if the current time is within the valid period registered associatedly with the keywords, the news information containing the keywords registered by the user is displayed after being converted to symbols. Therefore, the user cannot recognize the content of the information. However, by viewing the display data after being replaced with the symbols, the user can understand that the information related to the registered keywords is displayed. On the other hand, if the current time is beyond the valid period, even for news information containing the keywords, the news information is displayed in its present form, without replacing any character with a symbol or the like, thereby allowing the user to know the content of the information. Hence, the user can change a display state of specific information depending on time, and can appropriately obtain information depending on situation. This further improves user convenience.

Although the case where the character string containing the keywords is displayed by replacing it with the symbols if the current time is within the valid period is illustrated above, the converse is also possible. That is, if the current time is within the valid period, the character string containing the keywords in a predetermined range is displayed in its original characters without being replaced with other symbols or the like, whereas if the current time is beyond the valid period, the character string in the predetermined range containing the keywords may be displayed on the display device 5 by replacing the character string with other symbols or the like.

Third Exemplary Embodiment

Figure 7:
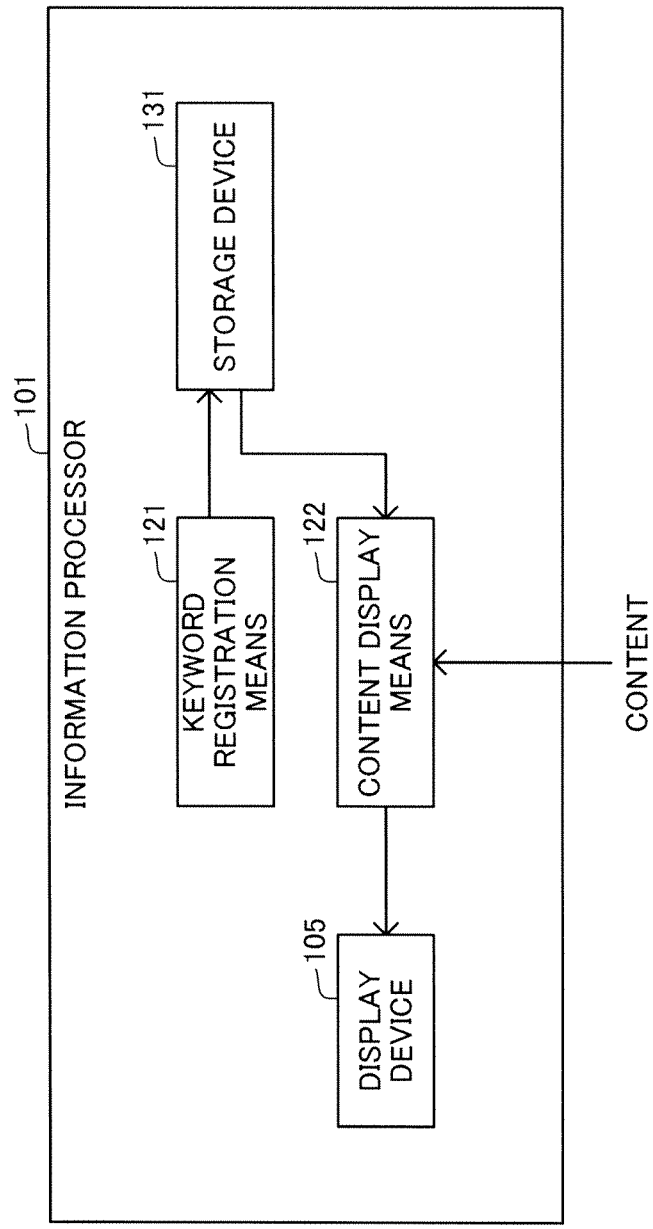
FIG. 7 is a function block diagram showing the configuration of an information processor in a third exemplary embodiment.

A third exemplary embodiment of the present invention is described below by referring to FIG. 7. FIG. 7 is a function block diagram showing the configuration of an information processor according to the present exemplary embodiment. In the present exemplary embodiment, the user terminal 1 is illustrated as the information processor 101, and the outline of the configuration of the user terminal 1 is explained.

The information processor 101, which is an exemplary embodiment of the present invention, includes a keyword registration means 121 for accepting an input of a keyword composed of a predetermined character string and storing the accepted keyword in a storage device 131; and a content display means 122 for displaying externally acquired content on a display device 105. The content display means 122 is configured to display the content on the display device 105 by replacing a character string in a preset range containing the keyword with other display data if the keyword stored in the storage device 131 exists in character information contained in the content.

According to the above invention, firstly, the user previously registers keywords into the information processor. When the user obtains content from a web site on the information processor and displays character information of the content on the display device, the information processor replaces a character string in a predetermined range containing the keywords with other display data, and displays the character string on the display device. Therefore, by viewing the character string displayed after being replaced with other display data on the display device, the user can recognize that the character string contains the registered keywords. As a result, the user can know only that the character information containing the keyword is displayed, without recognizing the content of the character information containing the keywords.

That is, to the user who does not want to know the content of specific information, but desires notification of the occurrence of the information, the content of the specific information can be obscured while adequately notifying the occurrence of the specific information. This improves user convenience.

The information processor is configured as follows. That is, the keyword registration means accepts an input of period information inputted together with the keyword, and associatedly stores the keyword and the period information in the storage device. The content display means compares a period indicated by the period information stored in the storage device associatedly with the keyword existing in the character information contained in the content, and current and displays the content in its present form on the display device according to a comparison result.

The information processor is configured as follows. That is, the keyword registration means accepts an input of valid period information indicating a period during which the keyword is valid, which is inputted together with the keyword, and associatedly stores the keyword and the valid period information in the storage device. The content display means acquires current time information indicating current time; compares a valid period indicated by the valid period information stored in the storage device associatedly with the keyword existing in the character information contained in the content, and current time indicated by the current time information; and displays the content on the display device by replacing a character string in a preset range containing the keyword with other display data if the current time is within the valid period, whereas displays the content in its present form on the display device if the current time is beyond the valid period.

According to the above invention, the user firstly registers keywords and period information into the information processor. When the user obtains content on the information processor and displays character information of the content on the display device, the information processor compares the period information associated with the keywords, and current time if the registered keywords are contained in the content. At this time, if the current time is within a period indicated by the period information, the image processor displays the content on the display device by replacing a character string in a predetermined range containing the keywords. On the other hand, if the current time is beyond the period, the image processor displays the content retaining the original character string on the display device without replacing the character string containing the keywords with other display data.

Therefore, within the period set to a specific keyword, the user cannot recognize the content of information containing the keyword while knowing the presence of the information. Beyond the period, the user can know the content of the information containing the specific keyword. Thus, the user can change the display state of the specific information depending on time. This further improves user convenience.

In the information processor, the content display means is configured to replace a character string in a range of a sentence described in an identical paragraph containing the keyword, with other display data.

In the information processor, the content display means is configured to replace a character string in a range to which address information identical to address information set to the keyword existing in the content is set, with other display data.

In the information processor, the content display means is configured to replace a character string in a preset range containing the keyword with a predetermined symbol.

The information processor as described above is implemented by incorporating a computer program into the information processor. Specifically, the computer program, which is other exemplary embodiment of the present invention, includes instructions for causing the information processor to implement a keyword registration means for accepting an input of a keyword composed of a predetermined character string and storing the accepted keyword in a storage device; and a content display means for displaying externally acquired content on a display device. The content display means is configured to display the content on the display device by replacing a character string in a preset range containing the keyword with other display data if the keyword stored in the storage device exists in character information contained in the content.

The computer program is configured as follows. That is, the keyword registration means accepts an input of period information inputted together with the keyword, and associatedly stores the keyword and the period information in the storage device. The content display means compares a period indicated by the period information stored in the storage device associatedly with the keyword existing in the character information contained in the content, and current time; and displays the content in its present form on the display device according to a comparison result.

The computer program is configured as follows. That is, the keyword registration means accepts an input of valid period information indicating a period during which the keyword is valid, which is inputted together with the keyword, and associatedly stores the keyword and the valid period information in the storage device. The content display means acquires current time information indicating current time; compares a valid period indicated by the valid period information stored in the storage device associatedly with the keyword existing in character information contained in the content, and current time indicated by the current time information; and displays the content on the display device by replacing a character string in a preset range containing the keyword with other display data if the current time is within the valid period, whereas displays the content in its present form on the display device if the current time is beyond the valid period.

A method of processing information according to other exemplary embodiment of the present invention, which is executed by allowing the information processor to operate, includes accepting an input of a keyword composed of a predetermined character string and storing the accepted keyword in a storage device; and displaying externally acquired content on a display device. When displaying the content, the method is configured to include displaying the content on the display device by replacing a character string in a preset range containing the keyword with other display data if the keyword stored in the storage device exists in character information contained in the content.

The method of processing information is configured as follows. That is, when storing the keyword, the method includes accepting an input of period information inputted together with the keyword, and associatedly storing the keyword and the period information in the storage device. When displaying the content, the method includes comparing a period indicated by the period information stored in the storage device associatedly with the keyword existing in the character information contained in the content, and current time; and displaying the content in its present form on the display device according to a comparison result.

The method of processing information is configured as follows. That is, when storing the keyword, the method includes accepting an input of valid period information indicating a period during which the keyword is valid, which is inputted together with the keyword; and associatedly storing the keyword and the valid period information in the storage device. When displaying the content, the method includes acquiring current time information indicating current time; comparing a valid period indicated by the valid period information stored in the storage device associatedly with the keyword existing in character information contained in the content, and current time indicated by the current time information; and displaying the content on the display device by replacing a character string in a preset range containing the keyword with other display data if the current time is within the valid period, whereas displaying the content in its present form on the display device if the current time is beyond the valid period.

The invention of the computer program or the method of processing information which has the configuration described above has a similar action to the information processor, and is therefore capable of achieving the object of the present invention described above.

While the present invention has been described herein with reference to the foregoing exemplary embodiments, it is to be understood that the present invention is not limited thereto. Various changes and modifications that are understandable to those skilled in the art within the scope of the present invention can be made in the configurations and details of the present invention.

The present invention claims the benefit of priority from Japanese Application No. 2009-189942 filed on Aug. 19, 2009, which is hereby incorporated by reference herein in its entirety.

The present invention is usable for functions such as browsers for inspecting web sites which are installed on personal computers and mobile phones, and hence has industrial applicability.

DESCRIPTION OF REFERENCE NUMERALS 1 user terminal
2 processor
21 keyword registration processing section
22 content display processing section
3 storage device
31 keyword storage section
4 input device
5 display device
8 web server
101 information processor
105 display device
121 keyword registration means
122 content display means
131 storage device

The invention claimed is:
1. A method of processing information, the method comprising:
  accepting an input of a keyword comprising a predetermined character string and storing the accepted keyword in a storage device; and
  displaying externally acquired content on a display device;
  wherein displaying the content comprises displaying the content on the display device by replacing a character string in a preset range containing the keyword with other display data if the keyword stored in the storage device exists in character information contained in the content;

wherein storing the keyword comprises accepting an input of valid period information indicating a period during which the keyword is valid, which is inputted together with the keyword, and storing the keyword and the valid period information to be associated with each other in the storage device;

wherein displaying the content comprises acquiring current time information, comparing the valid period information with the current time information, and displaying the content on the display device by replacing the character string in the preset range containing the keyword with other display data if the current time is within the valid period; and wherein display the content comprises displaying the content in a present form on the display device if the current time is beyond the valid period.

\* \* \* \* \*